United States Patent
Hagiwara et al.

(10) Patent No.: US 8,986,126 B2
(45) Date of Patent: Mar. 24, 2015

(54) CROSS UNIVERSAL JOINT AND MANUFACTURING METHOD THEREOF

(75) Inventors: Nobuyuki Hagiwara, Gunma (JP); Kaname Yasuda, Gunma (JP); Minao Umeda, Gunma (JP); Kazuho Chikaraishi, Gunma (JP); Tadashi Hibino, Gunma (JP); Hiroki Mizuno, Gunma (JP); Masahiro Inoue, Gunma (JP); Masaharu Igarashi, Gunma (JP); Osamu Tatewaki, Gunma (JP); Kiyoshi Sadakata, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/118,969

(22) PCT Filed: Jul. 23, 2012

(86) PCT No.: PCT/JP2012/068592
§ 371 (c)(1),
(2), (4) Date: Nov. 20, 2013

(87) PCT Pub. No.: WO2013/077026
PCT Pub. Date: May 30, 2013

(65) Prior Publication Data
US 2014/0080611 A1    Mar. 20, 2014

(30) Foreign Application Priority Data
Nov. 24, 2011   (JP) ................. 2011-256128

(51) Int. Cl.
*F16D 3/38* (2006.01)
*F16D 3/26* (2006.01)

(52) U.S. Cl.
CPC ...... *F16D 3/26* (2013.01); *F16D 3/387* (2013.01); *F16D 2300/12* (2013.01); *Y10S 29/047* (2013.01); *Y10S 72/713* (2013.01)
USPC ............... 464/23; 29/DIG. 47; 72/370.13; 72/713; 464/134

(58) Field of Classification Search
USPC ......... 464/23, 134, 135; 72/370.13, 713, 714; 29/888, DIG. 16, DIG. 47
See application file for complete search history.

(56) References Cited

U.S. PATENT DOCUMENTS 4,995,849 A  *  2/1991  Castellon ................. 464/134
2005/0282641 A1 * 12/2005  Sadakata et al. .......... 464/134

FOREIGN PATENT DOCUMENTS

GB          345555   *  3/1931  .............. 464/135
GB     2 053 417 A  *  2/1981  .............. 464/134

(Continued)

OTHER PUBLICATIONS

Yonaka Motorsports, 2.5" Stainless Steel Straight Pipe, [online], www.yonaka.com, retrieved from the Internet Sep. 9, 2014.*

(Continued)

*Primary Examiner* — Gregory Binda
(74) *Attorney, Agent, or Firm* — Katten Muchin Rosenman LLP

(57) ABSTRACT

Structure of a cross universal joint is achieved in which the fact that an excessive torque was applied to a universal joint due to a collision accident or mishandling can be easily determined afterwards. Protrusions 20, which are straight lines as seen from the outside surface sides of linking arm sections 15c of a yoke 12c, are formed on the outside surfaces of the linking arm sections 15c. When an excessive torque acts and the linking arm sections 15c are plastically deformed, the protrusions 20 change from a straight line to a non-straight line. From this change it is possible to easily confirm that an excessive torque has been applied to a cross universal joint that includes this yoke 12c. Moreover, when the space between the inside surfaces of the linking arm sections 15c is taken to be D, and the length in the axial direction of the linking arm sections 15c is taken to be L, the dimensions of the parts of the yoke 12c are regulated so that the relation $3 < L/D \leq 4$ is satisfied.

2 Claims, 11 Drawing Sheets

(56) References Cited

FOREIGN PATENT DOCUMENTS

| | | | | |
|---|---|---|---|---|
| JP | 4-29620 A | * | 1/1992 | ............ 464/135 |
| JP | 06-280889 A | | 10/1994 | |
| JP | 08-270669 A | | 10/1996 | |
| JP | 11-325098 A | | 11/1999 | |
| JP | 2007-132504 A | | 5/2007 | |
| JP | 2007-205376 A | | 8/2007 | |
| JP | 2008-051159 A | | 3/2008 | |
| JP | 2009-299706 | | 12/2009 | |

OTHER PUBLICATIONS

International Search Report and Written Opinion dated Aug. 28, 2012 from the corresponding PCT/JP2012/068592.

* cited by examiner (A)

(B)

CROSS UNIVERSAL JOINT AND MANUFACTURING METHOD THEREOF

TECHNICAL FIELD

The present invention relates to a cross universal joint (Cardin joint) for connecting rotating shafts of a steering apparatus for an automobile so as to be able to transmit torque.

BACKGROUND ART

As illustrated in FIG. 11, a steering apparatus for an automobile is constructed such that rotation of a steering wheel 1 is transmitted to an input shaft 3 of a steering gear unit 2, and as the input shaft 3 rotates, a pair of left and right tie rods 4 are pushed or pulled, which applies a steering angle to steered wheels (front wheels). The steering wheel 1 is supported by and fastened to the rear end section of a steering shaft 5, and that steering shaft 5 is inserted in the axial direction through a steering column 6, and is supported by this steering column 6 so as to be able to rotate freely. Moreover, the front end section of the steering shaft 5 is connected to the rear end section of an intermediate shaft 8 by way of a universal joint 7, and the front end section of this intermediate shaft 8 is connected to the input shaft 3 by way of another universal joint 9. In the example in the figure, an electric power-steering apparatus, having an electric motor 10 as an auxiliary power source, is assembled in order to reduce the force required for operating the steering wheel 1. Therefore, the front end section of the steering shaft 5 is connected to the input side of this electric power-steering apparatus, and the output shaft of this electric power-steering apparatus and the rear end section of the intermediate shaft 8 are connected by way of the universal joint 7 so as to transmit torque freely.

Cross universal joints are used as the universal joints 7, 9 that connect the steering shaft 5, intermediate shaft 8 and input shaft 3, which are rotating shafts that are assembled in this kind of automobile steering apparatus and that are not on the same line as each other. Various kinds of structure are known for this kind of cross universal joint, for example, as disclosed in JPH 06-280889 (A), JPH 08-270669 (A), JPH 11-325098 (A), and JP 2009-299706 (A). FIG. 12 illustrates an example of conventional structure as disclosed in JPH 08-270669 (A).

The universal joint 11 that is illustrated in FIG. 12 is constructed by joining a pair yokes 12a, 12b by way of one joint spider 13 so as to able to freely transmit torque. These yokes 12a, 12b are made by performing pressing or forging of a metal material, and each yoke 12a (12b) comprises a base section 14a (14b) and a pair of linking arm sections 15a (15b). A pair of circular holes 16a (16b) is formed concentric with each other on the tip end of each of the linking arm sections 15a (15b). The joint spider 13 is constructed so that four shaft sections 17 are such that the center axes of adjacent shaft sections 17 are orthogonal with each other. These shaft sections 17 are supported on the inside of the circular holes 16a, 16b by way of cup shell type radial needle bearing 18, to form a universal joint 11.

When a vehicle, in which a steering apparatus is mounted with these kinds of universal joints 7, 9, 11 assembled, is involved in a collision accident, or when a steered wheel rides up on a curb by mishandling, an impulsively excessive torque may be applied to the universal joints 7, 9, 11 from the steering gear unit 2 side. Due to this kind of impulsively excessive torque, there is a possibility that all or part of these component members will be damaged, or that safe continuous operation of the vehicle will be obstructed. For example, the linking arm sections 15a (15b) may become deformed, and concentricity of the circular holes 16a (16b) that are formed on the tip end sections of these linking arm sections 15a (15b) may be impaired. In the case that this concentricity is impaired, problems occur in that the function of the radial needle bearing 18 is impaired, and it becomes easy for each of the parts to wear out. In such a case, even though the user may take the vehicle to a repair shop, if the repairperson is inexperienced and depending the extent of the damage, there is a possibility that the problem with the universal joints 7, 9, 11 will not be found. Furthermore, in the case that an impulsively excessive torque is applied, there is a possibility that the circular holes 16a (16b) of the linking arms 15a (15b) will be pressed and expanded, allowing the radial needle bearings 18 of the joint spider 13 to fall off from the circular holes 16a (16b), impairing the function as a cross universal joint.

RELATED LITERATURE

Patent Literature

[Patent Literature 1] JPH 06-280889 (A)
[Patent Literature 2] JPH 08-270669 (A)
[Patent Literature 3] JPH 11-325098 (A)
[Patent Literature 4] JP 2009-299706 (A)

SUMMARY OF THE INVENTION

Problem to be Solved by the Invention

In consideration of the situation described above, the objective of the present invention is to achieve structure of a cross universal joint for which it is possible to easily determine this even when an excessive torque is applied to the universal joint due to a collision accident or mishandling, and to achieve structure of a cross universal joint that prevents the joint spider from falling off and is able to maintain the minimum function of the joint.

Means for Solving the Problems

The cross universal joint of the present invention comprises a pair of yokes, and a joint spider that connects the yokes so as to be able to pivotally displace. Each yoke is made of metal such as a ferrous alloy like carbon steel, or a light alloy like an aluminum alloy or magnesium alloy, and comprises: a base section for connecting and fastening to the end section of a rotating shaft; a pair of linking arm sections that extend in the axial direction from two locations on the edge of one end in the axial direction of the base section on opposite sides in the radial direction of the rotating shaft; and a pair of circular holes that are formed in the tip end sections of the linking arm sections so as to be concentric with each other. Moreover, the joint spider is made of a ferrous alloy such as bearing steel, high-speed tool steel, carbon steel and the like, and comprises four shaft sections that are provided so that the center axes of adjacent shaft sections are orthogonal to each other. The tip end sections of these shaft sections of the joint spider are supported by way of bearings inside the circular holes that are provided in the yokes so as to be able to rotate freely.

Particularly, in the cross universal joint of the present invention, reference lines, which are straight lines as seen from the outside surfaces sides of the linking arm sections and that extends in the axial direction of the base sections, are displayed on the outside surfaces of the linking arm sections of at least one of the yokes, in at least the portions nearer to the base section than the circular holes.

In the cross universal joint of the present invention, preferably, the rigidity of the linking arm sections is regulated such that when an excessive torque is applied, the linking arm sections plastically deform in the twisting direction before the circular holes in the linking arm sections are pressed and expanded enough that the bearings of the joint spider fall off.

In order for this kind of configuration, for example, when the space between the inside surfaces of the linking arm sections of at least one of the yokes is taken to be D, and the length in the axial direction of these linking arm sections are taken to be L, the dimensions of the parts of the cross universal joint are regulated so that the relation $3<L/D\leq 4$ is satisfied; or in other words, the length in the axial direction of the linking arm sections can be made to be longer than in the case of a conventional cross universal joint.

The reference lines can extend from the outside surface of the linking arm sections to the outer circumferential surface of the base section.

Moreover, the yoke can be integrally formed with the cylindrical shaft section such that the base section is continuous with the end section of a cylindrical shaft section such as the input shaft or intermediate shaft (outer shaft or inner shaft) of a steering gear unit.

The structure of the reference lines is arbitrary as long as the reference lines can be easily checked by visually determining whether there is any change, and, the reference lines can be protrusions that protrude outward or can be concave grooves that are depressed inward in the radial direction of the base section from the outside surfaces of the linking arm sections.

When manufacturing the cross universal joint of the present invention that is integrally formed with the cylindrical shaft, and the reference lines are the protrusions or the concave grooves; (1) a first intermediate material is obtained by performing forward extrusion of a column shaped material made of metal, wherein a column shaped section is provided on one end section in the axial direction, and a cylindrical shaft section is provided on the other end section from the middle section in the axial direction; (2) a second intermediate material is obtained by pressing a punch in the center section of one end surface in the axial direction of the first intermediate material with the first intermediate material set inside a die having: cavities for forming a pair of arm sections that correspond to the linking arm sections in two locations on opposite side in the radial direction of the inner circumferential surface of the portion that surrounds the column shaped section; and concave grooves or protrusions that extends in the axial direction of the column shaped section that are formed in a center section in a circumferential direction of the cavities for forming these arm sections, and by forming the linking arm sections at the same time of forming protrusions or concave grooves which are the reference lines in a center section of an outside surface of these linking arm sections by crushing the center section in the radial direction of the column shaped section in the axial direction and pouring the metal material into the cavities for forming the arm sections; and (3) a yoke that is integrally formed with the shaft section is obtained by performing finishing processing of the second intermediate material that includes the formation of circular holes that are concentric with each other on the tip end sections of the linking arm sections, and this yoke is linked with another yoke by way of the joint spider.

Effect of the Invention

With the cross universal joint of the present invention, when an excessive torque is applied to the yoke of a universal joint due to a collision accident or mishandling, and as a result, linking arm sections of the yoke become deformed, the shape of reference lines that are displayed on the outside surface of these linking arm sections changes from a straight line to a non-straight line. This change can be easily distinguished even by an inexperienced repairperson, so it becomes possible to easily and accurately determine that a problem has occurred in the cross universal joint, and thus appropriate repair or replacement work can be performed.

Moreover, with the cross universal joint of the present invention, due to the relation with the space between inside surfaces of the linking arm sections, the length in the axial direction of the pair of linking arm sections of the yoke is longer than in a conventional yoke, and the rigidity of the linking arm sections is moderately reduced, making it more difficult for a joint spider that spans between circular holes that are provided in the tip end sections of these linking arm sections from falling off. In other words, when an excessive torque is impulsively applied to the linking arm sections, the linking arm sections result in plastic deformation in the twisting direction before the circular hole are pressed and expanded enough that the radial needle bearings located inside the circular holes fall off. Due to this plastic deformation, the concentricity of the circular holes is lost and so the function of the cross universal joint is impaired a little, however, the radial needle bearings are held as is inside the circular holes, so the minimum function of transmitting torque or the like between a pair of shafts is maintained.

Furthermore, the yoke is integrated with a cylindrical shaft section, so the structure having protrusions or concave grooves as reference lines formed on the outside surfaces of the pair of linking arm sections of the yoke can be achieved efficiently and at low cost.

BRIEF DESCRIPTION OF THE DRAWINGS

FIG. 6B and FIG. 6C are graphs illustrating the slope of the reference line and the relation between the value of the excessive torque and the durability.

MODES FOR CARRYING OUT THE INVENTION

Figure 1:
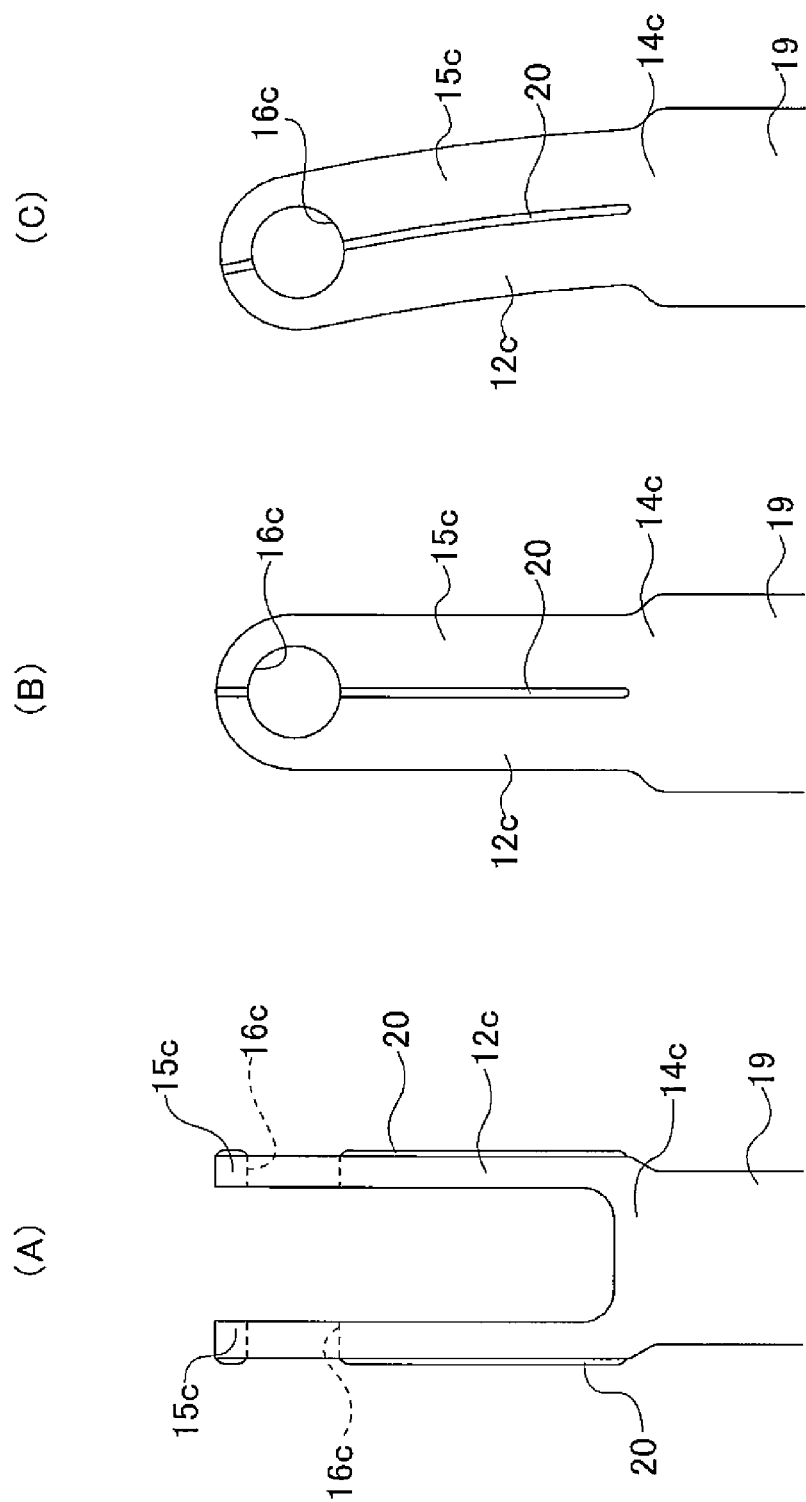
FIG. 1A is a front view of a yoke, and illustrates an example of an embodiment of the present invention.
FIG. 1B is a side view of the normal state thereof.
FIG. 1C is a side view of the deformed state thereof.
Figure 2:
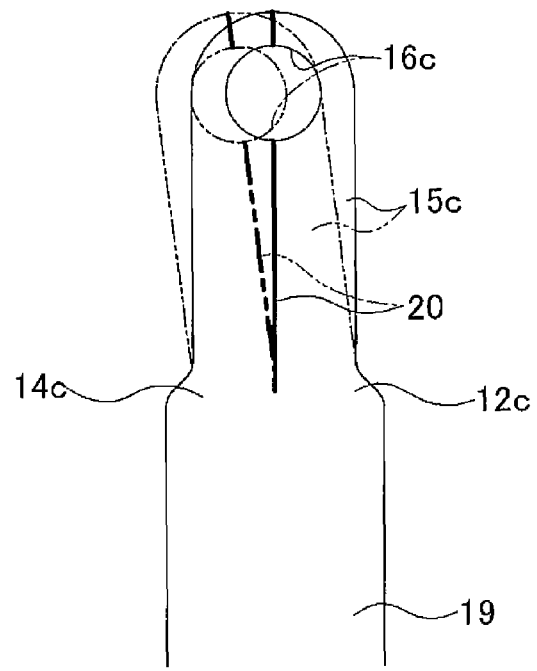
FIG. 2 is a schematic drawing for explaining the deformed state of the linking arm section of a yoke that is deformed by an excessive torque in an example of an embodiment of the present invention.
Figure 3:
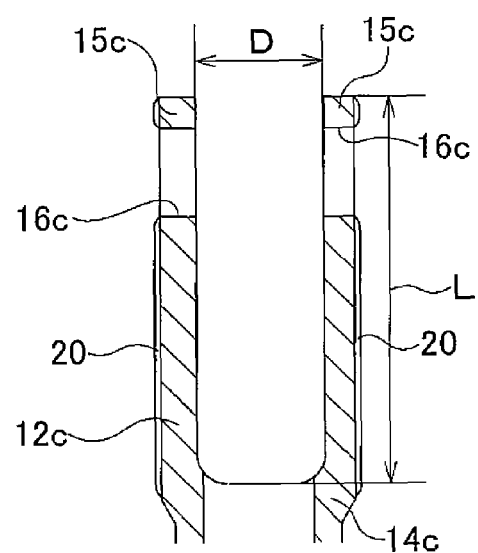
FIG. 3 is a schematic drawing for explaining the relation between the space between the inside surfaces of the pair of linking arm sections of a yoke and the length in the axial direction of these linking arm sections, of an example of an embodiment of the present invention.
Figure 4:
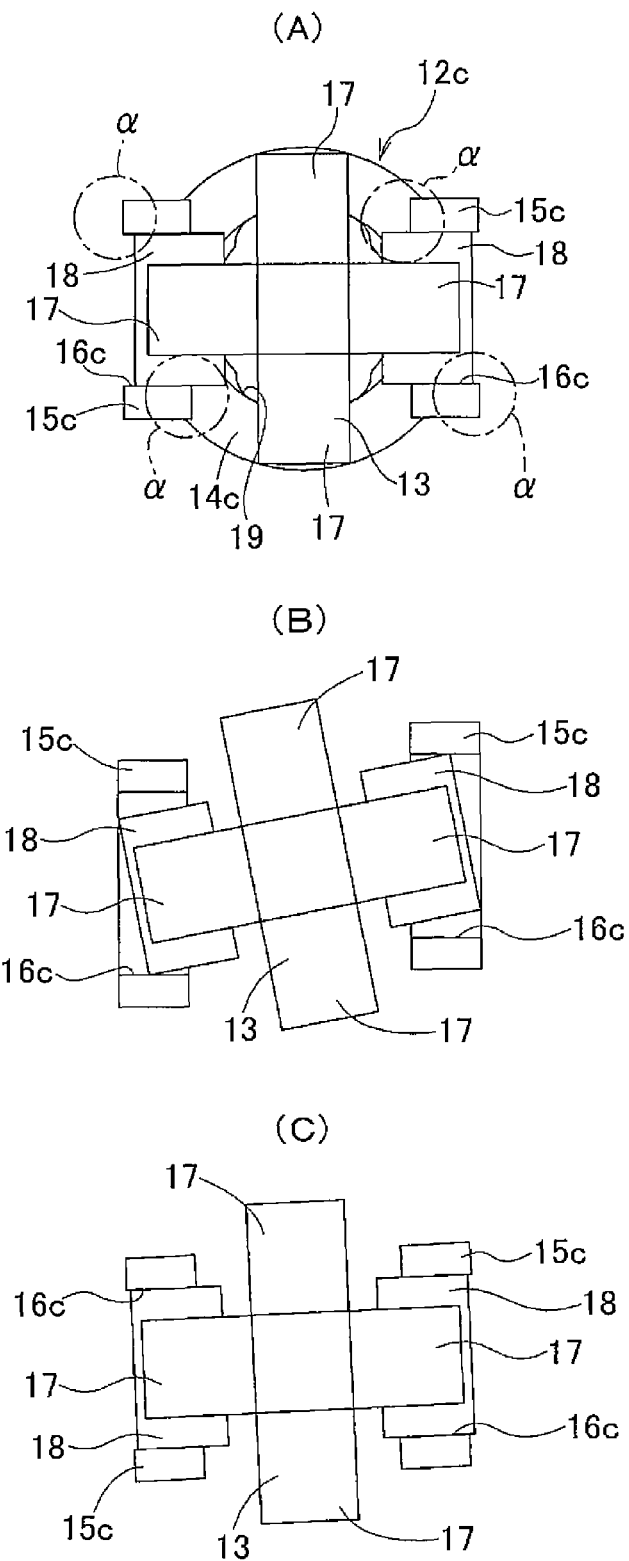
FIGS. 4A to 4C are schematic drawings for explaining the reason why, by lengthening the length in the axial direction of the linking arm sections, it becomes difficult for the joint spider that spans between the circular holes that are provided in the tip end sections of these linking arms sections, to fall off when an excessive torque is applied.
Figure 5:
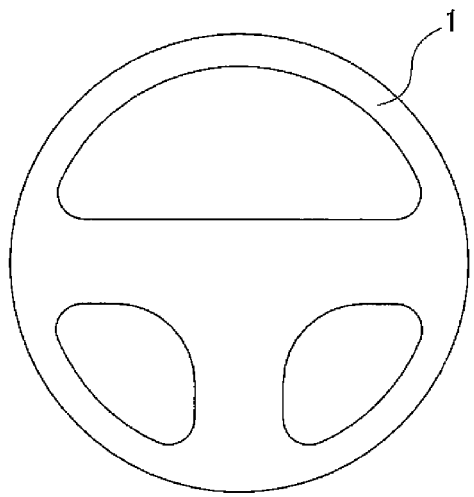
FIGS. 5A and 5B are schematic drawings for explaining the change in the neutral position of the steering wheel due to plastic deformation of the linking arm sections of the yokes caused by excessive torque.
Figure 5:
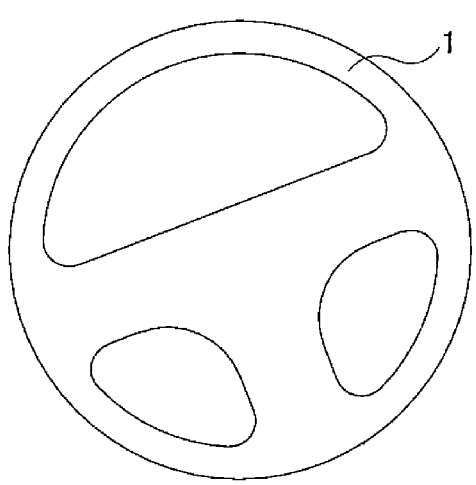
Figure 6:
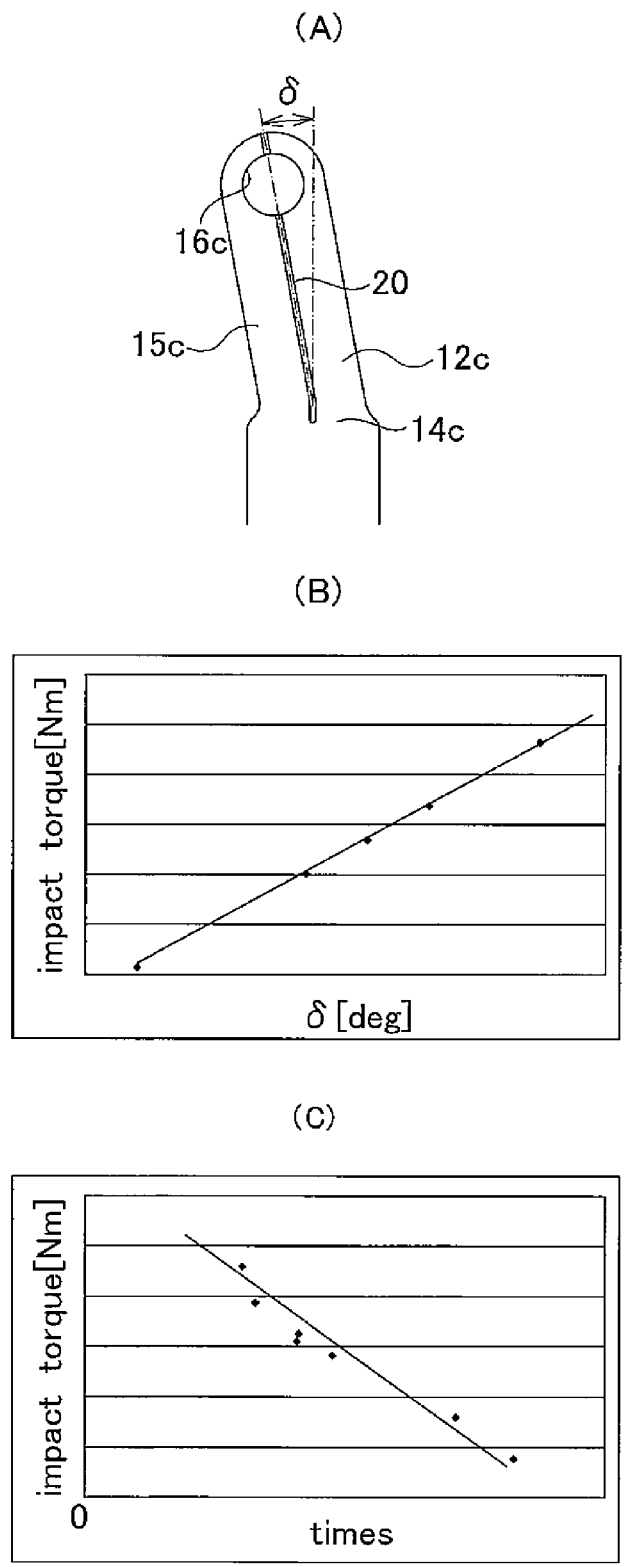
FIGS. 6A to 6C illustrate the procedure for finding the value of an excessive torque that is applied to a yoke based on the slope of a reference line, and for finding the durability of the cross universal joint based on this excessive torque, where FIG. 6A a schematic drawing of a yoke.

FIG. 1A to FIG. 10C illustrate a first example of an embodiment of the present invention. Features of the present invention, including this example, is displaying a reference line, which is a straight line as seen from the outside surface side of a pair of linking arm sections, on the outside surfaces of these linking arm sections of at least one yoke of a pair of yokes of a cross universal joint, and is appropriately regulating the rigidity of the pair of linking arm sections of the yoke. The basic structure and functions of the other parts are the same as in a conventional cross universal joint, so any redundant drawings and explanations are either omitted or simplified, with the explanation below centering on the features of this example.

A joint spider 13 of the cross universal joint of this example, as in the conventional structure, is made using a ferrous alloy such as bearing steel, high-speed tool steel, carbon steel or the like, and comprises four shaft sections 17 that are provided in a state such that the center axes of adjacent shaft sections 17 are orthogonal to each other. Moreover, the yoke 12c of the cross universal joint of this example is made by performing cold forging of a metal material such as a ferrous alloy like carbon steel, or a light alloy such as an aluminum alloy or magnesium alloy, and comprises a base section 14c and a pair of linking arm sections 15c.

Figure 11:
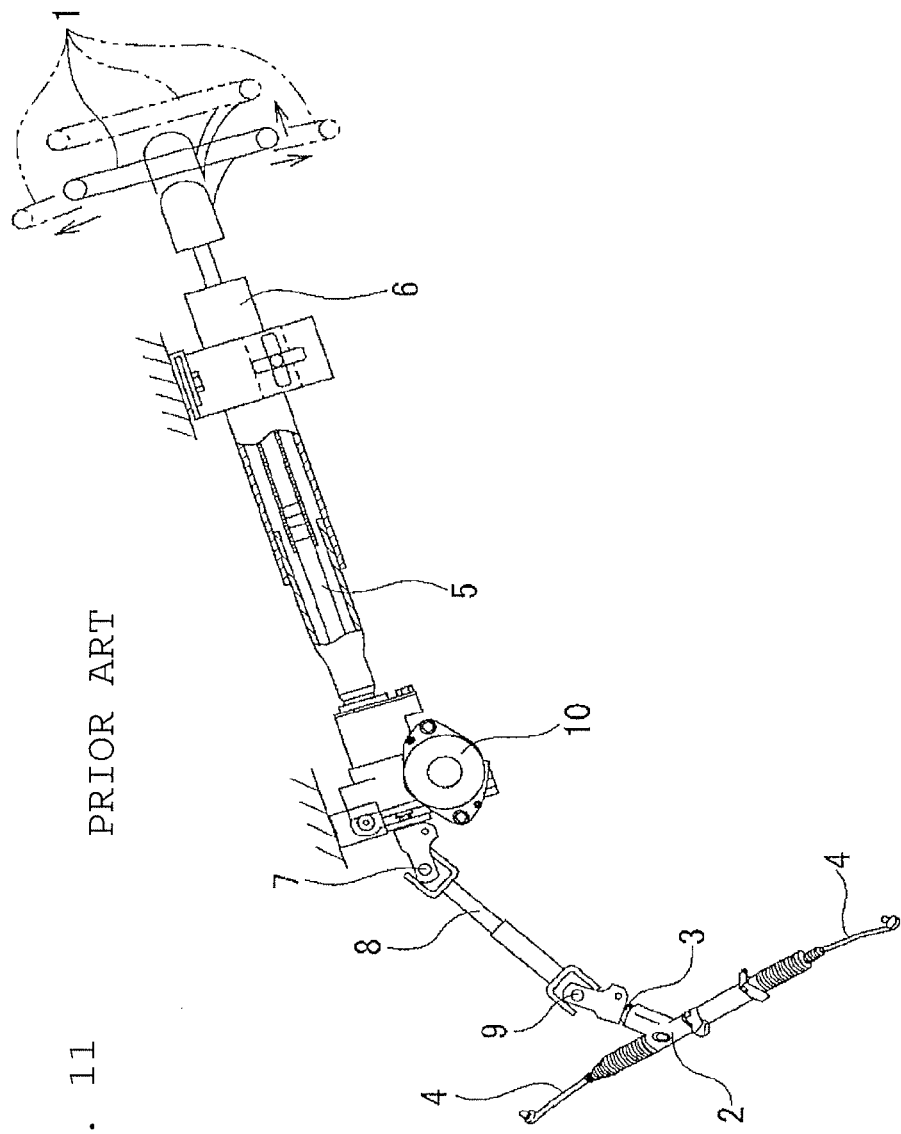
FIG. 11 is a partial cross-sectional side view illustrating an example of a steering apparatus for an automobile in which cross universal joints are assembled.
Figure 12:
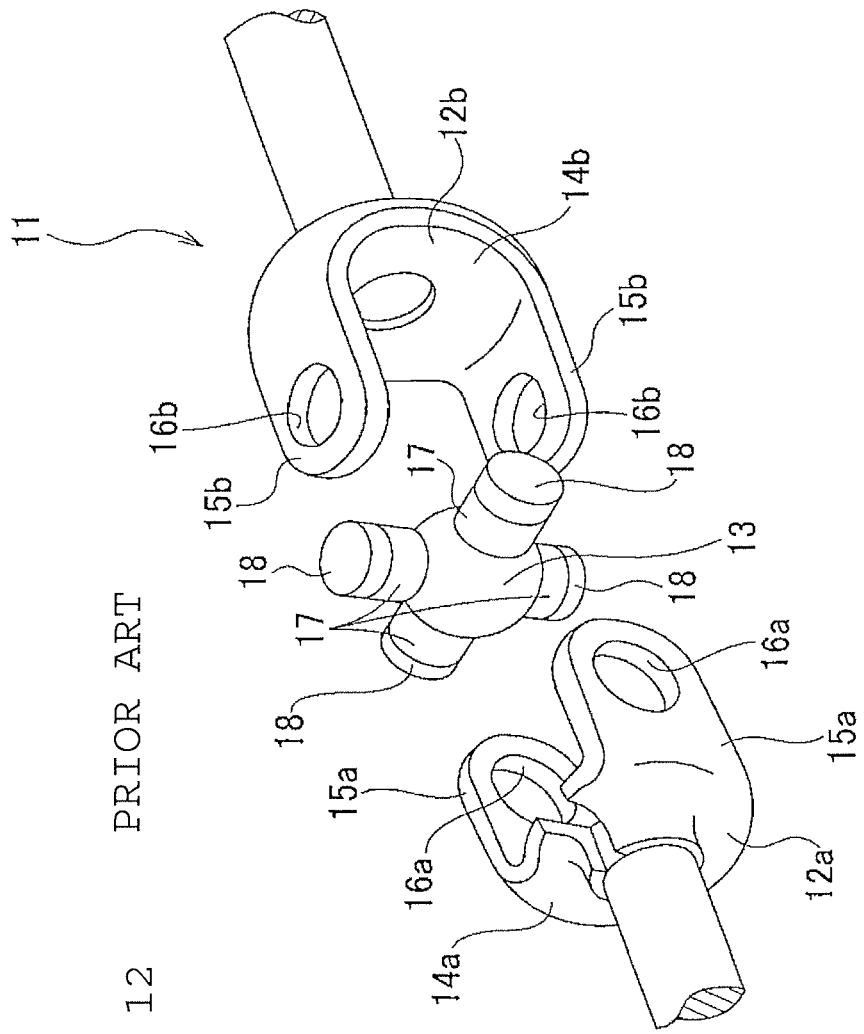
FIG. 12 is an exploded perspective view illustrating an example of conventional structure of a cross universal joint.

In the structure of this example, the base section 14c of the yoke 12c is integrally formed with cylindrical outer shaft 19. In other words, the base section 14c is integrally provided on the end section in the axial direction of the outer shaft 19 (top side in FIG. 1A to FIG. 3). This base section 14c is a cylindrical shape, and the pair of linking arm sections 15c extend in the axial direction toward the opposite side from the outer shaft 19 from two locations of the base section 14c on opposite sides in the radial direction of the edge on the opposite side from the outer shaft 19. In this example, the shape of the linking arm sections 15c is a flat plate shape, and circular holes 16c that are concentric with each other are formed in the tip end sections of the linking arm sections 15c. The outer shaft 19 fits with a spline fit (including a ball spline) with an inner shaft (not illustrated in the figure) to form a telescopic intermediate shaft 8 (see FIG. 11). This point is conventionally known structure, so detailed drawings and explanation are omitted.

Particularly, the yoke 12c of the cross universal joint of this example is such that protrusions 20, which are the reference lines, are formed in the center sections in the width direction (circumferential direction of the base section 14c) on the outside surfaces of the linking arm sections 15c. These protrusions 20 extend in the axial direction of the base section 14c, and form a straight line as seen from the outside surface sides of the linking arm sections 15c. The structure of the protrusions 20 is sufficient as long as they can be easily seen. On the other hand, with the existence of these protrusions 20, preferably the strength and rigidity of the linking arm sections 15c do not change with respect to the design values. Therefore, when the reference lines are protrusions, the height of the protrusions 20 is preferably made as small as possible with the protrusions 20 still clearly visible in a narrow engine room, with a maximum height of about 0.5 mm. Moreover, the reference lines can be formed as concave grooves. In that case, the value of the depth of the grooves is preferably as small as possible with the grooves still clearly visible in the narrow engine room, with the maximum depth being about 0.5 mm. With respect to the width, in order that deformation of the protrusions 20 or grooves can be easily seen, a small width is preferred, however, preventing a concentration of stress in the portion where the protrusions 20 or grooves are formed must be taken into consideration. In consideration of this point, preferably the protrusions 20 are such that the radius of curvature of the cross-sectional shape is about 10 mm to 20 mm, and are a convex partial cylindrical shape. Moreover, in the case of grooves, preferably the radius of curvature of the cross-sectional shape is 10 mm to 30 mm, and the grooves are a concave partial cylindrical shape. It is necessary that the protrusions 20 or grooves be formed in the portion of the outside surface of the linking arm sections 15c nearer the base section 14c than the circular holes 16c, however, in this example, for convenience of processing, the protrusions 20 are also formed in the portion nearer the tip ends than the circular holes 16c. Moreover, preferably, the protrusions 20 are provided so as to extend from the linking arm sections 15c to the outer circumferential surface of the base section 14c.

In this example, the length in the axial direction of the linking arm sections 15c of the yoke 12c is a little longer than in the conventional structure. Specifically, when the space between the inside surfaces of these linking arm sections 15c is taken to be D, and the length in the axial direction of these linking arm sections 15c (the distance in the axial direction from the edge on the end of the base section 14c to the edge on the tip end of these linking arm sections 15c) is taken to be L, the dimensions of each part are regulated so that the relation $3 < L/D \leq 4$ is satisfied. In other words, conventionally the dimensions of each part were regulated so that the ratio L/D was approximately 2 ($L/D \approx 2$), however, in this example, the length L in the axial direction of the linking arm sections 15c with respect to the space D is increased, and rigidity of the linking arm sections 15c in the torque transmission direction is decreased a little compared with the conventional structure.

When a vehicle having a steering apparatus for an automobile, in which the cross universal joint of this example comprising this kind of yoke 12c is assembled, is in a collision accident, or when a steered wheel rides up on a curb by mishandling, or the like, an excessive torque is applied to the yoke 12c. This excessive torque is applied between the base sections of the pair of yokes that are linked together by way of the joint spider 13 of the cross universal joint, so the linking arm sections 15c of the yoke 12c plastically deform in a direction that corresponds to the direction that the excessive toque acts, from the state illustrated in FIG. 1B to the state illustrated in FIG. 1C, or from the state illustrated by the solid line to the state illustrated by the chain line in FIG. 2. As a result of this plastic deformation, the shape of the protrusions 20, which are reference lines on the outside surfaces of the linking arm sections 15c changes from a straight line as illustrated in FIG. 1B to a non-straight line as illustrated in FIG. 1C.

Whether or not the protrusions 20 are straight lines can be easily checked visually, or even with a straight ruler or the like as necessary, so by accurately forming the protrusions 20 so as to be straight lines in the normal state as illustrated in FIG. 1B, it is possible even for an inexperienced repairperson to easily determine that an excessive torque has been applied to the cross universal joint that includes the yoke 12c. Therefore, only by taking the vehicle having a cross universal joint for which there is a possibility that an excessive torque has been applied to a repair shop, it is possible for even an inexperienced repairperson to easily and accurately determine that trouble has occurred in the cross universal joint, and thus it is possible to perform suitable repair or replacement work.

Moreover, in the case of the structure of this example, the length L in the axial direction of these linking arm sections 15c is greater than 3 times but no greater than 4 times the space D between the inside surfaces of the linking arm sections 15c, so it is possible to moderately decrease the rigidity of the linking arm sections 15c. Even when an impulsively excessive torque acts on the cross universal joint that includes the yoke 12c, it is possible to make it difficult for the joint spider 13 that spans between the circular holes 16c that are formed in the tip end sections of the linking arm sections 15c to fall off. This point will be explained with reference to FIGS. 4A to 4C.

When an impulsively excessive torque is applied to a cross universal joint in which the yoke 12c and joint spider 13 are assembled, a large load is applied from both end sections of either of the shaft sections 17 of the joint spider 13 to the pair of linking arm sections 15c of the yoke 12c of the portions a at the four locations illustrated in FIG. 4A. When an excessive torque is applied when the ratio L/D of the length L in the axial direction of the linking arm sections 15c with respect to the space D between the inside surfaces of the linking arm sections 15c is small (3 or less), and the torsional rigidity of the linking arm sections 15c is high with respect to the strength of the portions where the circular holes 16c are formed in the tip end sections of the linking arm sections 15c (difficulty for these circular holes 16c to deform), then as illustrated in FIG. 4B, there is a possibility that the circular holes 16 that are formed in the tip end sections of these linking arm sections 15c will be pressed and expanded, and the radial needle bearings 18 that are placed inside these circular holes 16c will come out from the circular holes 16c. As a result, the function of the automobile steering apparatus in which the cross universal joint is assembled will be reduced or lost.

On the other hand, in the case of the structure of this example, the length in the axial direction of the linking arm sections 15c is made long (3<L/D≤4). Therefore, the circular holes 16c, before being pressed and expanded to the point where the radial needle bearings 18 fall off, the linking arm sections 15c plastically deform in the twisting direction as illustrated by the chain lines in FIG. 1C and FIG. 2. Due to this plastic deformation, the concentricity of the circular holes 16c is impaired, and the function of the cross universal joint (smooth displacement) is slightly impaired, however, the radial needle bearings 18 are held as is inside the circular holes 16c, so the minimum function of transmitting torque between a pair of shafts required for the cross universal joint is maintained.

The fact that an impulsively excessive torque is applied to the cross universal joint can be determined even by the driver. The reason for this is that by the linking arm sections 15c plastically deforming in the twisting direction due to this excessive torque, the phase in the direction of rotation between the outer shaft 19 that is integrally formed with the yoke 12c and another shaft that is linked to this outer shaft 19 by way of the joint spider 13 and another yoke is shifted. As a result of this shift in phase, the position of the neutral state of the steering wheel 1 for the vehicle to be in a state to travel straight ahead changes. In other words, when the vehicle is traveling straight ahead in the state before the yoke 12c plastically deforms, the position of the steering wheel is maintained in the initial state illustrated in FIG. 5A. On the other hand, when, due to the energy of an excessive torque, an impulsively excessive torque is applied to the yoke 12c, causing the linking arm sections 15c to plastically deform in the twisting direction and the phase to shift in the direction of rotation between the shafts 19 on both sides, the positions of the neutral state of the steering wheel 1 for the vehicle to travel straight ahead changes as illustrated in FIG. 5B. This change suddenly appears before and after an impact is applied to the steered wheels, so it is possible for the driver operating the steering wheel 1 to easily recognize that a problem has occurred in the steering apparatus. Therefore, it is possible to prompt the driver to perform repairs, and thus it is possible to avoid danger due to continued operation of the damaged vehicle.

On the other hand, change in the position of the steering wheel 1 from the state illustrated in FIG. 5A to the state illustrated in FIG. 5B also occurs when the wheels are not aligned properly. Therefore, at the repair shop where the vehicle is taken, it is difficult to immediately determine whether the state illustrated in FIG. 5B is due to the wheel that is out of alignment, or due to plastic deformation of the members of the cross universal joint. Particularly, when the driver has not explained to the repairperson the situation before and after the change from the state illustrated in FIG. 5A to the state illustrated in FIG. 5B, even though the yoke 12c has plastically deformed, it is possible to take time to identify the cause of the change in the position, or in other word, to realize that there was deformation of the yoke 12c. However, with the structure of this example, by looking at the protrusions 20, it is possible to easily check whether there was deformation due to excessive torque to the cross universal joint, and thus it is possible to quickly identify the cause of the change in position of the steering wheel.

Moreover, based on the amount of displacement (inclination angle) δ in the axial direction of the protrusions 20, which are reference lines displayed on the outside surfaces of the linking arm sections 15c, that occurs due to plastic deformation of the linking arm sections 15 illustrated in FIG. 6A, it is possible to find the size of the excessive torque that is acted on the cross universal joint from FIG. 6B, for example. Furthermore, based on the size of the excessive torque that was found, it is possible to find the remaining life of the cross universal joint from FIG. 6C. FIG. 6B and FIG. 6C can be found in advance by computer analysis or testing.

In the cross universal joint of the present invention, as long as the rigidity of the linking arm sections 15c is regulated when an impulsively excessive torque is applied so that the linking arm sections 15c plastically deform in the twisting direction only up to just before the circular holes 16c in the linking arm sections 15c are pressed and expanded to where the bearings 18 of the joint spider 13 fall off, this kind of structure for regulating the rigidity of the linking arm sections 15c is not limited to the structure of this example.

Figure 7:
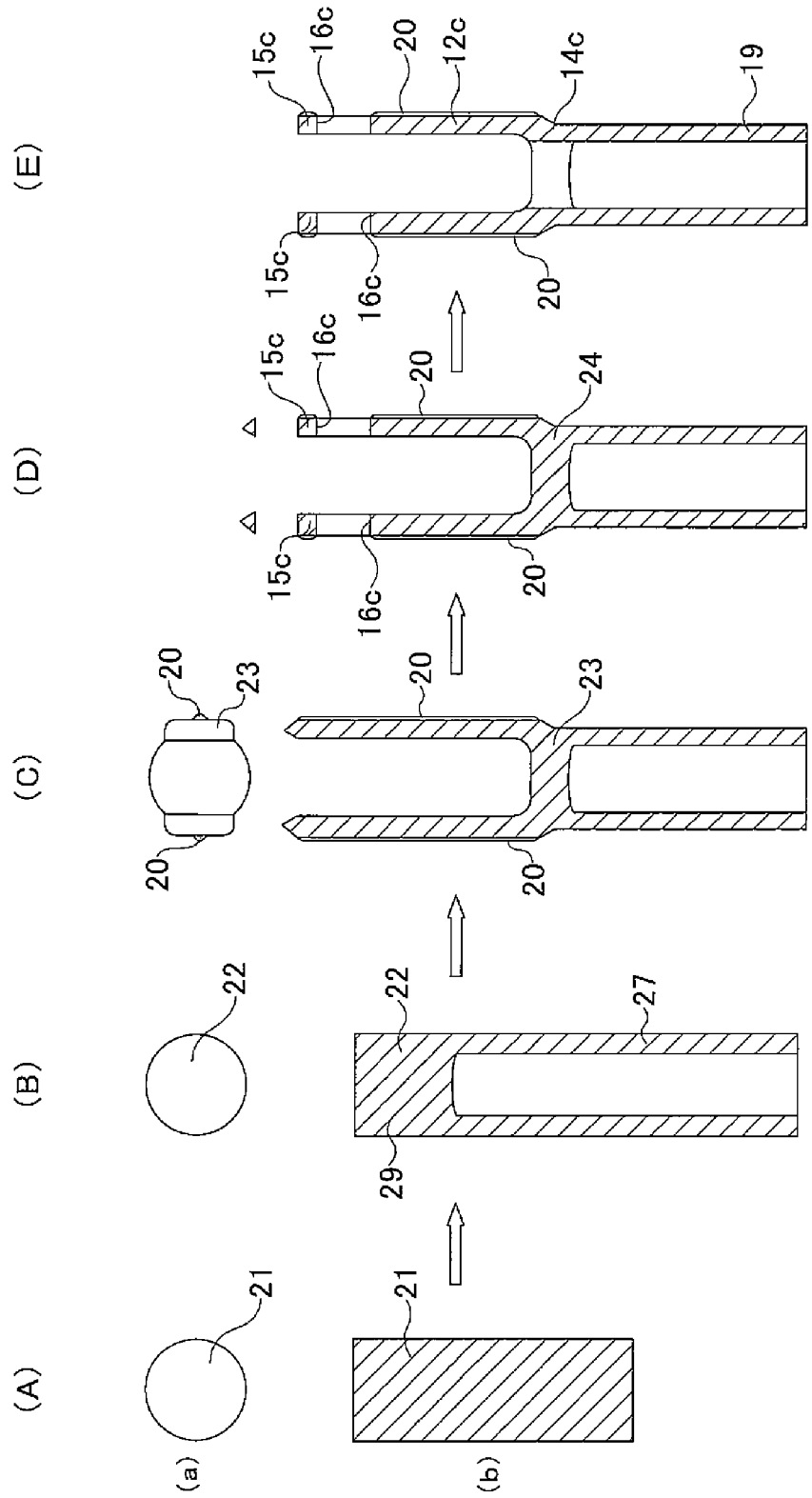
FIGS. 7A to 7E illustrate an example of the processing steps of a manufacturing method for a yoke that is integrated with an outer tube, where (a) of FIGS. 7A to 7E are end views, and (b) of FIGS. 7A to 7E are cross-sectional views.

Next, the method for manufacturing a so-called tube yoke that integrates the yoke 12c with the outer shaft 19 on which protrusions 20 are provided on the outside surfaces of the pair of linking arm sections 15c will be explained with reference to FIG. 7A to FIG. 10C. This kind of tube yoke, as conventionally known, is a yoke that is manufactured using carbon steel such as S10C to S45C, by sequentially performing cold forging such as by forward or backward extrusion of the raw material into a column shaped material 21 such as illustrated in FIG. 7A, and then passing through the stages of the first intermediate material 22 illustrated in FIG. 7B, the second intermediate material 23 illustrated in FIG. 7C and the third intermediate material 24 illustrated in FIG. 7D, to obtain the yoke 12c that is integrated with the outer shaft 19 as illustrated in FIG. 7E. In this process, in the step of performing backward extrusion of the first intermediate material 22 illustrated in FIG. 7B to obtain the second intermediate material 23 illustrated in FIG. 7C, protrusions 20 are formed on the outside surfaces of the linking arm sections 15c. The conditions for performing the backward extrusion and forming these protrusions 20 will be explained using FIG. 8 to FIG. 10C.

Figure 8:
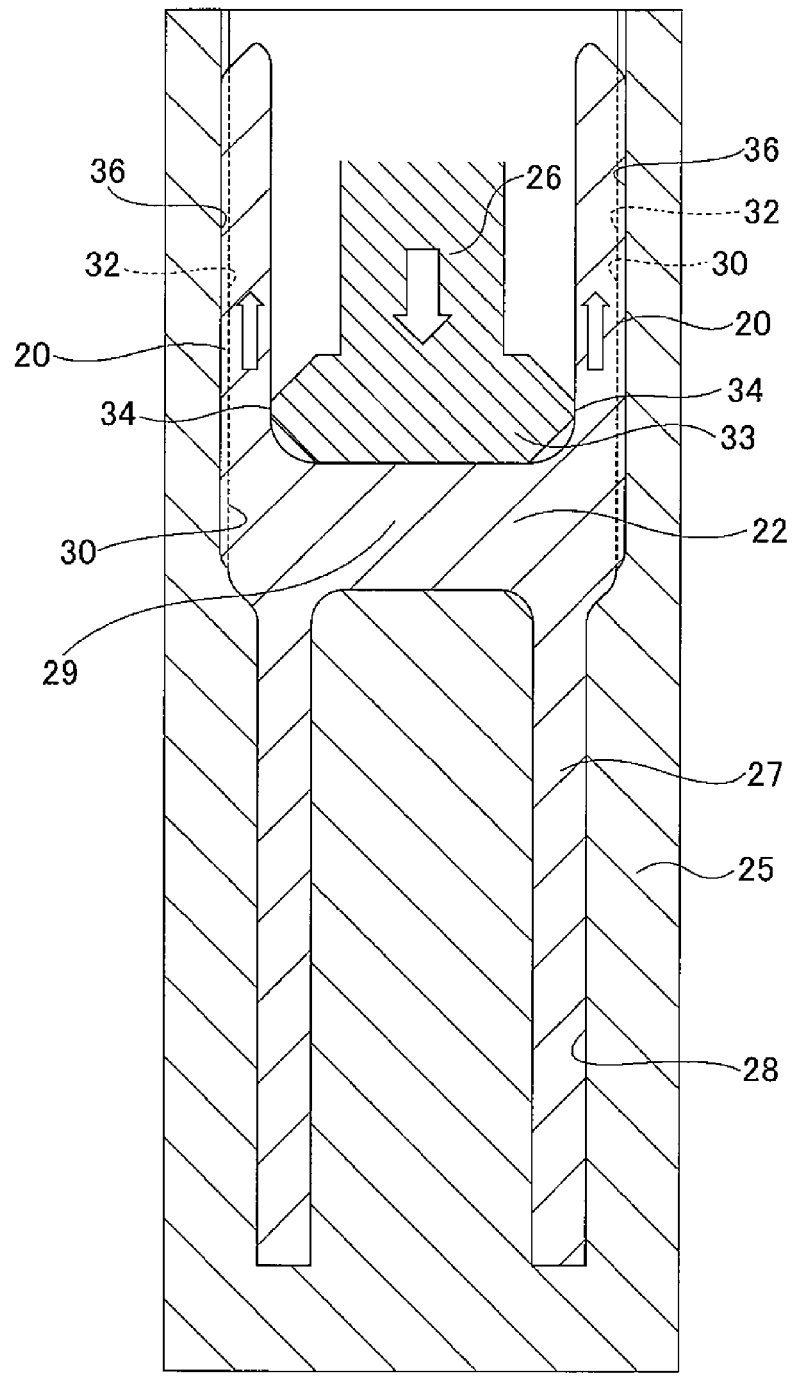
FIG. 8 is a cross-sectional view illustrating the process for forming a pair of linking arm sections by backward extrusion, and for forming protrusions on the outside surface of these linking arm sections at the same time.
Figure 9:
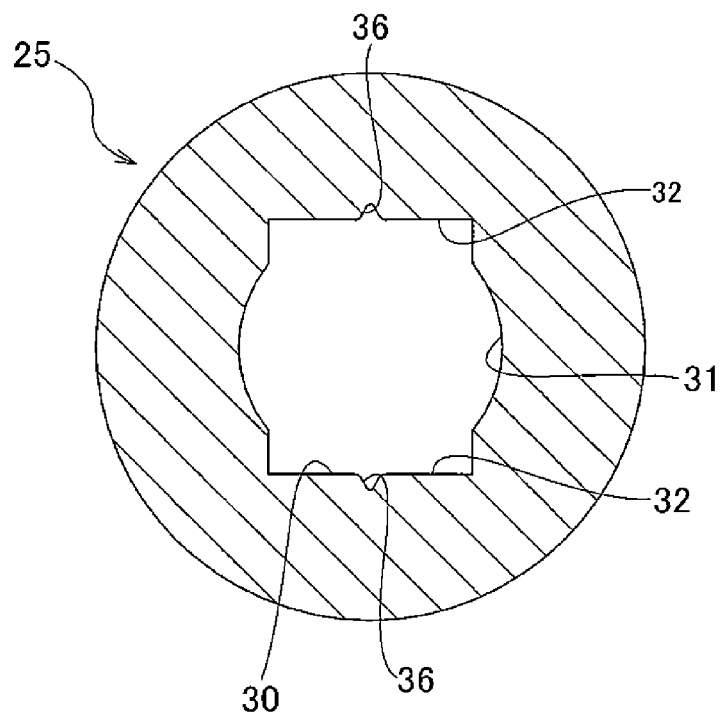
FIG. 9 is cross-sectional view of a die that is used in the forming process.
Figure 10:
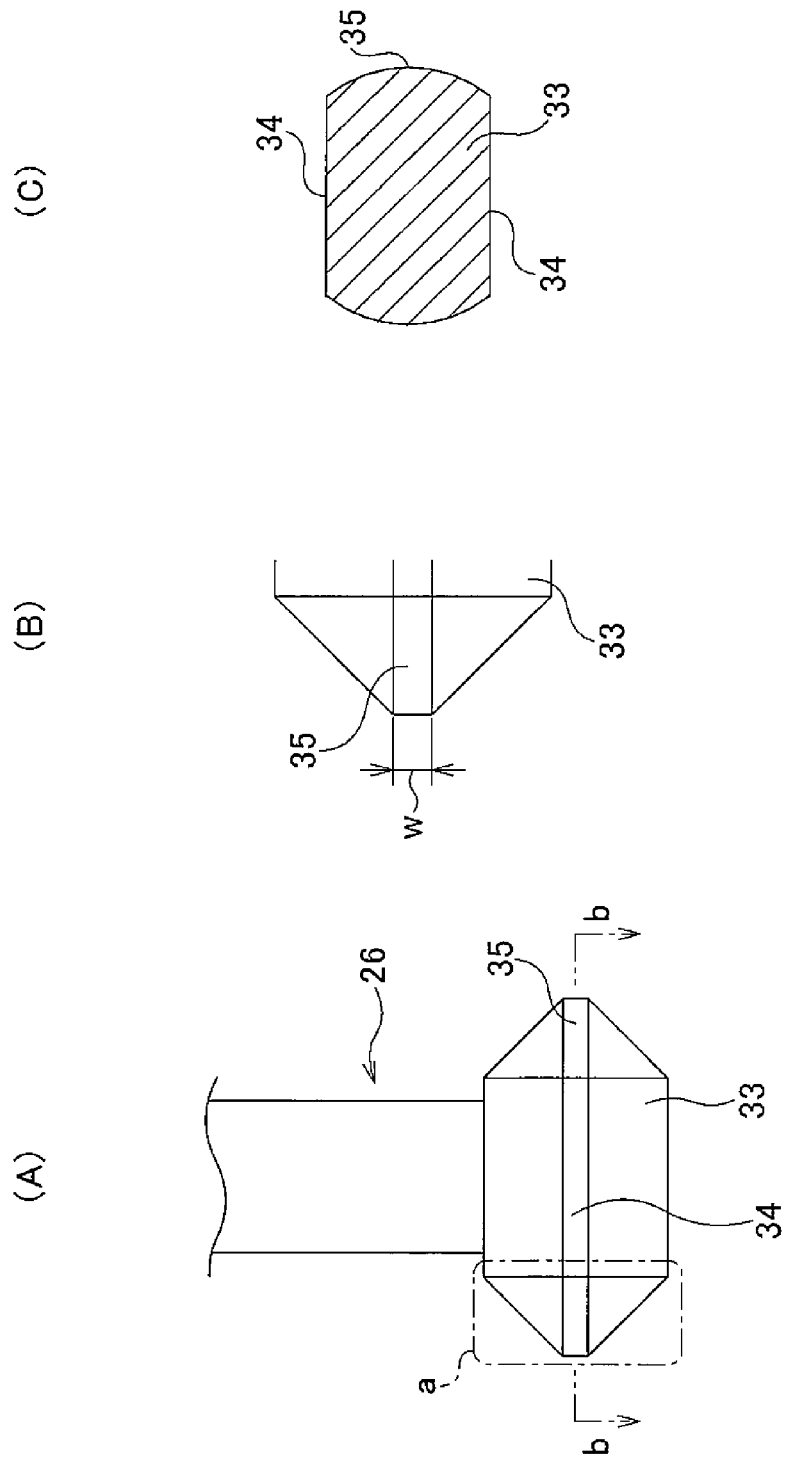
FIG. 10A is a side view of a punch that is used in the forming process.
FIG. 10B is an enlarged view of part a in FIG. 10A.
FIG. 10C is a partial cross-sectional view of section b-b in FIG. 10A.

As illustrated in FIG. 8, in the backward extrusion process, with the first intermediate material 22 placed inside a die 25, which is the receiving mold, the center section of the end surface in the axial direction of the first intermediate material 22 is strongly pressed by a punch 26, which is the pressing mold. The die 25 comprises a cylindrical hollow section 28 that holds a cylindrical shaped section 27 of the first intermediate material 22 without any gaps, and a formation space 30 for causing a column shaped section 29 of the first intermediate material 22 to plastically deform. This formation space 30, as illustrated in FIG. 9, is constructed by providing protruding sections 32 at two locations on opposite sides in the radial direction of a circular section 31 (the left and right sides in FIG. 8, and the top and bottom sides in FIG. 9) so as to protrude outward in the radial direction. The circular section 31 has an inner diameter that is a little larger than the outer diameter of the column shaped section 29, and has a shape and size capable of pressing, with hardly any gaps, both end sections in the long radial direction (left-right direction in FIGS. 10A to 10C) of an elliptical (oval shaped) pressing section 33 that is provided on the tip end section of the punch 26, as illustrated in FIGS. 10A to 10C.

Moreover, the protruding sections 32 are for forming the linking arm sections 15c, and have an inner surface shape that corresponds to the outside surfaces and the outer shape of the edge sections on both sides in the circumferential direction of the linking arm sections 15c. Concave grooves 36 for forming the protrusions 20 are formed in the center sections of the back surfaces of the protruding sections 32. In FIG. 9, in order for clarification, the concave grooves 36 are drawn large. Moreover, the outer circumferential surface of the pressing section 33 of the punch 26 is a peak shape such that the center section in the axial direction protrudes outward in the radial direction, and a land section 35 is formed around the entire circumference of the tip end section. The width "w" in the axial direction of this land section 35 is less than the width of the land section of the punch for typical backward extrusion molding. The reason for this is to reduce the force required for backward extrusion by suppressing friction between the pressing section 33 and the column shaped section 29 of the first intermediate material 22, which is the processed object, thus making it possible to increase the length L in the axial direction of the linking arm sections 15c. In this example, the width "w" of the land section 35 is set to 0.1 mm to 0.5 mm. Moreover, of this land section 35, the portions that face the inside surface of the protruding sections 32 are flat surfaces 34. It is also possible to use a divided mold in which the die 25 is separated into two in the radial direction by the concave grooves 36. Furthermore, in the case of forming concave grooves as the reference lines, the structure on the inner circumferential surface of the die 25 for forming the reference lines can be protrusions instead of concave grooves 36, or pins can be placed inside the concave grooves 36, and by fitting one half of a pair of pins inside the concave grooves, a concave groove can be formed with the other half section of these pins.

In the backward extrusion process, together with forming the linking arm sections 15c by pressing (crushing) the column shaped section 29 of the first intermediate material 22 in the axial direction with the pressing section 33 of the punch 26, and feeding an excess metal resulting from the pressing into the protruding sections 32, the straight protrusions 20 are formed on the outside surfaces of the linking arm sections 15c. As a result, the second intermediate material 23 that is illustrated in FIG. 7C is obtained. Of this second intermediate material 23, circular holes 16c are punched into the linking arm sections 15c, and by removing (trimming) the excess on the tip end sections of the linking arm sections 15c, the third intermediate material 24 illustrated in FIG. 7D is obtained. Furthermore, by punching out the excess in the portion between the cylindrical section 27 and the linking arm sections 15c, and aligning the shape and dimensions of each section, the yoke 12c that is integrated with the outer shaft 19 as illustrated in FIG. 7E is obtained.

After that, preferably heat treatment, such as soft nitriding, of the yoke 12c that was integrally formed with the outer shaft 19 is performed at 470° C. to 580° C., such that the surface is hard and the core is soft. The reason for this is to further improve the energy absorbing performance of the yoke 12c by securing durability by making the surface hard, and removing internal strain that occurred during the backward extrusion process.

In the present invention, in order to make it possible to easily confirm later the fact that an excessive torque was applied, as long as the reference lines that are formed on the outside surfaces on the pair of linking arm sections of the yoke do not adversely affect the strength, rigidity or durability of the linking arm sections, and such that they do not become difficult to see due to wear that occurs during use over a long period of time, it is possible to use structure other than protrusions or grooves. Moreover, the yoke also does not have to be integrally constructed with the outer shaft, and can be constructed so as to be separate from the inner shaft of the intermediate shaft or the steering shaft, and can be connected and fastened to the end sections of these shafts.

EXPLANATION OF REFERENCE NUMBERS

1 Steering wheel
2 Steering gear unit
3 Input shaft
4 Tie rod
5 Steering shaft
6 Steering column
7 Universal joint
8 Intermediate shaft
9 Universal joint
10 Electric motor
11 Universal joint
12a, 12b, 12c Yoke
13 Joint spider
14a, 14b, 14c Base section
15a, 15b, 15c Linking arm section
16a, 16b, 16c Circular hole
17 Shaft section 18 Radial needle bearing
19 Outer shaft
20 Protrusion
21 Material
22 First intermediate material
23 Second intermediate material
24 Third intermediate material
25 Die
26 Punch
27 Cylindrical section
28 Cylindrical hollow section
29 Column shaped section
30 Formation space
31 Circular section
32 Protruding section
33 Pressing section
34 Flat section
35 Land section
36 Concave groove

What is claimed is:

1. A cross universal joint, comprising:
a pair of yokes; and
a joint spider that connects the yokes so as to be able to pivotally displace freely; wherein
each of the yokes is made of metal and comprises:
a base section for connecting and fastening to an end section of a rotating shaft;
a pair of linking arm sections that extend in an axial direction from two locations on an edge of one end in the axial direction of the base section on opposite sides in a radial direction of the rotating shaft; and
a pair of circular holes that are formed in tip end sections of the linking arm sections so as to be concentric with each other;
the joint spider being made of a ferrous alloy and comprises four shaft sections that are provided so that center axes of adjacent shaft sections are orthogonal to each other, and tip end sections of these shaft sections are supported by way of bearings inside the circular holes that are provided in the yokes so as to be able to rotate freely;
reference lines, which are straight lines as seen from outside surfaces sides of the linking arm sections and that extends in an axial direction of the base sections, is displayed on the outside surfaces of the linking arm sections of at least one of the yokes, in at least the portions nearer to the base section than the circular holes; and
the space between the inside surfaces of the linking arm sections of at least one of the yokes is taken to be D, and the length in the axial direction of the linking arm sections is taken to be L, a relation 3<L/D≤4 is satisfied.

2. A manufacturing method for manufacturing a cross universal joint;
the cross universal joint comprising
a pair of yokes; and
a joint spider that connects the yokes so as to be able to pivotally displace freely; wherein
each of the yokes is made of metal and comprises:
a base section for connecting and fastening to an end section of a rotating shaft;
a pair of linking arm sections that extend in an axial direction from two locations on an edge of one end in the axial direction of the base section on opposite sides in a radial direction of the rotating shaft; and
a pair of circular holes that are formed in tip end sections of the linking arm sections so as to be concentric with each other;
the joint spider being made of a ferrous alloy and comprises four shaft sections that are provided so that center axes of adjacent shaft sections are orthogonal to each other, and tip end sections of these shaft sections are supported by way of bearings inside the circular holes that are provided in the yokes so as to be able to rotate freely;
reference lines, which are straight lines as seen from outside surface sides of the linking arm sections and that extends in an axial direction of the base sections, is displayed on the outside surfaces of the linking arm sections of at least one of the yokes, in at least the portions nearer to the base section than the circular holes; and
the reference lines comprises protrusions that protrude outward or concave grooves that are depressed inward in the radial direction of the base section from the outside surfaces of the linking arm sections;
the base section is connected to an end section of a cylindrical shaft section, and the yoke is integrally formed with the shaft section,
the method comprising steps of:
performing forward extrusion of a column shaped material made of metal, to obtain a first intermediate material wherein a column shaped section is provided on one end section in an axial direction, and a cylindrical shaft section is provided on the other end section from a middle section in the axial direction;
obtaining a second intermediate material by pressing a punch in a center section of one end surface in the axial direction of the first intermediate material with the first intermediate material set inside a die having: cavities for forming a pair of arm sections that correspond to the linking arm sections in two locations on opposite side in a radial direction of an inner circumferential surface of a portion that surrounds the column shaped section; and concave grooves or protrusions that are long in an axial direction of the column shaped section that are formed in a center section in a circumferential direction of the cavities for forming these arm sections, and by forming the linking arm sections at the same time of forming protrusions or concave grooves which are the reference lines in a center section of an outside surface of these linking arm sections by crushing the center section in the radial direction of the column shaped section in the axial direction and pouring the metal material into the cavities for forming the arm sections; and
performing a finishing process to the second intermediate material wherein the process includes formation of circular holes that are concentric with each other in the tip end sections of the linking arm sections to obtain a yoke that is integrally formed with the shaft section, then linking this yoke with another yoke by way of the joint spider.

* * * * *